US012471375B2

(12) United States Patent
Shi et al.

(10) Patent No.: US 12,471,375 B2
(45) Date of Patent: Nov. 11, 2025

(54) DISPLAY SUBSTRATE, DISPLAY PANEL, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lei Shi, Beijing (CN); Hongjun Yu, Beijing (CN); Yashuai An, Beijing (CN); Jian Wang, Beijing (CN); Yong Zhang, Beijing (CN); Xian Wang, Beijing (CN); Yang Ge, Beijing (CN); Jianwei Ma, Beijing (CN); Xingxing Guan, Beijing (CN); Wulin Zhang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/042,749

(22) PCT Filed: Jun. 13, 2022

(86) PCT No.: PCT/CN2022/098333
§ 371 (c)(1),
(2) Date: Feb. 23, 2023

(87) PCT Pub. No.: WO2023/240383
PCT Pub. Date: Dec. 21, 2023

(65) Prior Publication Data
US 2024/0297178 A1 Sep. 5, 2024

(51) Int. Cl.
G09G 5/00 (2006.01)
H10D 86/40 (2025.01)
H10D 86/60 (2025.01)
(52) U.S. Cl.
CPC .......... *H10D 86/60* (2025.01); *H10D 86/441* (2025.01)
(58) Field of Classification Search
CPC . G02F 1/1362; G02F 1/136204; H10D 86/60; H10D 86/441; G09G 5/00; H10K 59/131
See application file for complete search history.

(56) References Cited

U.S. PATENT DOCUMENTS 10,503,035 B2 * 12/2019 Yeom ................ G02F 1/136204
11,468,812 B2 * 10/2022 Kim ..................... H10D 89/921
(Continued)

FOREIGN PATENT DOCUMENTS

| CN | 1396656 A | 2/2003 |
| CN | 106200172 A | 12/2016 |

(Continued)

OTHER PUBLICATIONS

International Search Report and Written Opinion dated Dec. 13, 2022, for corresponding PCT Application No. PCT/CN2022/098333.

*Primary Examiner* — Joe H Cheng
(74) *Attorney, Agent, or Firm* — Kinney & Lange, P.A.

(57) ABSTRACT

A display substrate, a display panel and a display device are provided. At least one corner region of the display substrate includes: a plurality of first signal lines and at least one second signal line; and a plurality of groups of first bidirectional electrostatic discharge units and at least one second bidirectional electrostatic discharge unit. At least one first bidirectional electrostatic discharge unit includes a first electrostatic discharge end and a second electrostatic discharge end, the first electrostatic discharge end is electrically (Continued)

connected to at least one first signal line, and the second electrostatic discharge end is electrically connected to at least one second signal line through at least one second bidirectional electrostatic discharge unit. The second electrostatic discharge ends of at least two groups of first bidirectional electrostatic discharge units are electrically connected to the at least one second signal line through a same second bidirectional electrostatic discharge unit.

21 Claims, 8 Drawing Sheets

(56) References Cited

U.S. PATENT DOCUMENTS

| | | |
|---|---|---|
| 2003/0020845 A1 | 1/2003 | Lee et al. |
| 2013/0050173 A1 | 2/2013 | Koo |
| 2018/0088421 A1 | 3/2018 | Hao et al. |
| 2018/0108649 A1 | 4/2018 | Cheng |
| 2018/0180913 A1 | 6/2018 | Yeom et al. |
| 2021/0201736 A1* | 7/2021 | You .......................... G09G 3/20 |
| 2022/0069573 A1 | 3/2022 | Kim et al. |

FOREIGN PATENT DOCUMENTS

| | | |
|---|---|---|
| CN | 206057764 U | 3/2017 |
| CN | 206301112 U | 7/2017 |
| CN | 108254982 A | 7/2018 |
| CN | 108519707 A | 9/2018 |
| CN | 111223436 A | 6/2020 |
| CN | 111430302 A | 7/2020 |

\* cited by examiner

DISPLAY SUBSTRATE, DISPLAY PANEL, AND DISPLAY DEVICE

CROSS-REFERENCE TO RELATED APPLICATION(S)

This application is a Section 371 National Stage Application of International Application No. PCT/CN2022/098333, filed on Jun. 13, 2022, entitled "DISPLAY SUBSTRATE, DISPLAY PANEL, AND DISPLAY DEVICE", the content of which is incorporated herein by reference in its entirety.

TECHNICAL FIELD

The present disclosure relates to a field of a display technology, in particular to a display substrate, a display panel, and a display device.

BACKGROUND

Thin film transistor (TFT) display substrates are widely used in televisions, notebook computers, mobile phones, laptop computers and other display products. A thin film transistor includes a plurality of layers, and a preparation process of a display substrate may include a plurality of material deposition and separation processes, in which static electricity may be generated constantly. If the static electricity is not discharged in time and accumulated to a certain amount, an electro-discharge may occur, which may damage an internal structure of the display substrate.

SUMMARY

In view of the above problems, the present disclosure provides a display substrate, a display panel, and a display device.

According to a first aspect of the present disclosure, a display substrate is provided, the display substrate includes at least one corner region, and in at least one of the at least one corner region, the display substrate includes:
 a base substrate;
 a plurality of first signal lines and at least one second signal line arranged on the base substrate; and
 a plurality of groups of first bidirectional electrostatic discharge units and at least one second bidirectional electrostatic discharge unit arranged on the base substrate, wherein at least one group of first bidirectional electrostatic discharge unit includes at least one first bidirectional electrostatic discharge unit, and at least one first bidirectional electrostatic discharge unit includes a first electrostatic discharge end and a second electrostatic discharge end, the first electrostatic discharge end is electrically connected to at least one first signal line, and the second electrostatic discharge end is electrically connected to at least one second signal line through at least one second bidirectional electrostatic discharge unit;
 wherein the second electrostatic discharge ends of at least two groups of first bidirectional electrostatic discharge units are electrically connected to the at least one second signal line through a same second bidirectional electrostatic discharge unit.

According to embodiments of the present disclosure, the display substrate further includes a display region, and the at least one corner region surrounds at least one corner of the display region;
 at least one first signal line includes a part of a fourth signal line in the display region extending to the corner region, and at least one second signal line includes a part of a fifth signal line at an edge of the display region extending to the corner region;
 the at least one second bidirectional electrostatic discharge unit is electrically connected to a plurality of groups of first bidirectional electrostatic discharge units through a first connecting line; and
 an orthographic projection of the first connecting line on the base substrate is located on a side of an orthographic projection of the first signal line on the base substrate close to an orthographic projection of the second signal line on the base substrate.

According to embodiments of the present disclosure, the fourth signal line includes a data line, and the fifth signal line includes a common voltage signal line.

According to embodiments of the present disclosure, the orthographic projection of the first connecting line on the base substrate is located on a side of the orthographic projection of the second signal line on the base substrate away from the orthographic projection of the first signal line on the base substrate.

According to embodiments of the present disclosure, in the display region, the display substrate further includes a plurality of rows of sub-pixels, and in at least one corner region of the display substrate, the display substrate further includes:
 a plurality of third signal lines, wherein at least one third signal line has one end electrically connected to a first connecting portion and the other end electrically connected to at least some sub-pixels in at least one row of sub-pixels, and the first connecting portion is configured to electrically connect the third signal line with a gate driving circuit;
 wherein the first connecting line and the third signal line are arranged in a same layer, an orthographic projection of the first connecting portion on the base substrate is located on a side of the orthographic projection of the first signal line on the base substrate close to the orthographic projection of the second signal line on the base substrate, and the orthographic projection of the first connecting line on the base substrate is located on a side of the orthographic projection of the first connecting portion on the base substrate away from the orthographic projection of the first signal line on the base substrate.

According to embodiments of the present disclosure, the orthographic projection of the first connecting portion on the base substrate is located on a side of the orthographic projection of the second signal line on the base substrate away from the orthographic projection of the first signal line on the base substrate.

According to embodiments of the present disclosure, the display substrate further includes a gate metal layer and a metal conductive layer, the first connecting line and the third signal line are located in the gate metal layer, and the second signal line is located in the metal conductive layer.

According to embodiments of the present disclosure, the orthographic projection of the first connecting line on the base substrate is located between the orthographic projection of the second signal line on the base substrate and the orthographic projection of the first signal line on the base substrate.

According to embodiments of the present disclosure, in the display region, the display substrate further includes a plurality of rows of sub-pixels, and in at least one corner region of the display substrate, the display substrate further includes:

a plurality of third signal lines, wherein at least one third signal line has one end electrically connected to a first connecting portion and the other end electrically connected to at least some sub-pixels in at least one row of sub-pixels, the first connecting portion is configured to electrically connect the third signal line with a gate driving circuit;

wherein the first connecting line and the second signal line are arranged in a same layer, and the orthographic projection of the first connecting line is located between an orthographic projection of the first connecting portion on the base substrate and the orthographic projection of the second signal line on the base substrate.

According to embodiments of the present disclosure, the display substrate further includes a gate metal layer, and the first connecting line, the second signal line and the third signal line are located in the gate metal layer.

According to embodiments of the present disclosure, an orthographic projection of the second bidirectional electrostatic discharge unit on the base substrate is located between the orthographic projection of the first connecting line on the base substrate and the orthographic projection of the second signal line on the base substrate.

According to embodiments of the present disclosure, an orthographic projection of the second bidirectional electrostatic discharge unit on the base substrate is located on a side of an orthographic projection of an $x^{th}$ group of first bidirectional electrostatic discharge units on the base substrate away from a center of the display substrate; and the $x^{th}$ group of first bidirectional electrostatic discharge units includes a group of first bidirectional electrostatic discharge units farthest from the center of the display substrate, and x is a positive integer.

According to embodiments of the present disclosure, one second bidirectional electrostatic discharge unit is provided, and the second electrostatic discharge ends of the plurality of groups of first bidirectional electrostatic discharge units are electrically connected to the at least one second signal line through the second bidirectional electrostatic discharge unit.

According to embodiments of the present disclosure, an orthographic projection of the third signal line on the base substrate is substantially a straight line.

According to embodiments of the present disclosure, an orthographic projection of at least one group of first bidirectional electrostatic discharge units on the base substrate is located between orthographic projections of two adjacent third signal lines on the base substrate.

According to embodiments of the present disclosure, orthographic projections of two adjacent groups of first bidirectional electrostatic discharge units on the base substrate are separated by orthographic projections of a plurality of third signal lines on the base substrate.

According to embodiments of the present disclosure, the first bidirectional electrostatic discharge unit includes a first transistor and a second transistor, and the second bidirectional electrostatic discharge unit includes a third transistor and a fourth transistor;

a gate electrode of the first transistor, a first electrode of the first transistor and a second electrode of the second transistor are electrically connected to the first signal line, and a second electrode of the first transistor, a first electrode of the second transistor and a gate electrode of the second transistor are electrically connected to a first end of the first connecting line; and a first electrode of the third transistor, a gate electrode of the third transistor and a second electrode of the fourth transistor are electrically connected to a second end of the first connecting line, and a second electrode of the third transistor, a first electrode of the fourth transistor and a gate electrode of the fourth transistor are electrically connected to the second signal line.

According to embodiments of the present disclosure, the display substrate includes a first side for arranging a source driving circuit and a second side arranged opposite to the first side, and at least one corner region of the display substrate includes a first corner region on the first side and a second corner region on the second side; and in the first corner region and the second corner region, the display substrate includes a plurality of groups of first bidirectional electrostatic discharge units and at least one second bidirectional electrostatic discharge unit, and the first signal line electrically connected to the first bidirectional electrostatic discharge unit in the first corner region is different from the first signal line electrically connected to the first bidirectional electrostatic discharge unit in the second corner region.

According to embodiments of the present disclosure, the first bidirectional electrostatic discharge units correspond to the first signal lines respectively.

In a second aspect of the present disclosure, a display substrate is provided, the display substrate includes at least one corner region, and in at least one of the at least one corner region, the display substrate includes:

a base substrate;

a plurality of first signal lines and at least one second signal line arranged on the base substrate; and a group of first bidirectional electrostatic discharge units and a second bidirectional electrostatic discharge unit arranged on the base substrate; wherein the group of first bidirectional electrostatic discharge units includes at least one first bidirectional electrostatic discharge unit, and the at least one first bidirectional electrostatic discharge unit includes a first electrostatic discharge end and a second electrostatic discharge end, the first electrostatic discharge end is electrically connected to at least one first signal line, and the second electrostatic discharge end is electrically connected to at least one second signal line through the second bidirectional electrostatic discharge unit.

According to embodiments of the present disclosure, an orthographic projection of the second bidirectional electrostatic discharge unit on the base substrate is located on a side of an orthographic projection of the first bidirectional electrostatic discharge unit on the base substrate away from a center of the display substrate.

In a third aspect of the present disclosure, a display panel is provided, and the display panel includes the display substrate as described above.

In a fourth aspect of the present disclosure, a display device is provided, and the display device includes the display panel as described above.

BRIEF DESCRIPTION OF THE DRAWINGS

The above contents and other objectives, features and advantages of the present disclosure will be more apparent through the following description of embodiments of the present disclosure with reference to the accompanying drawings.

DETAILED DESCRIPTION OF EMBODIMENTS

Figure 1:
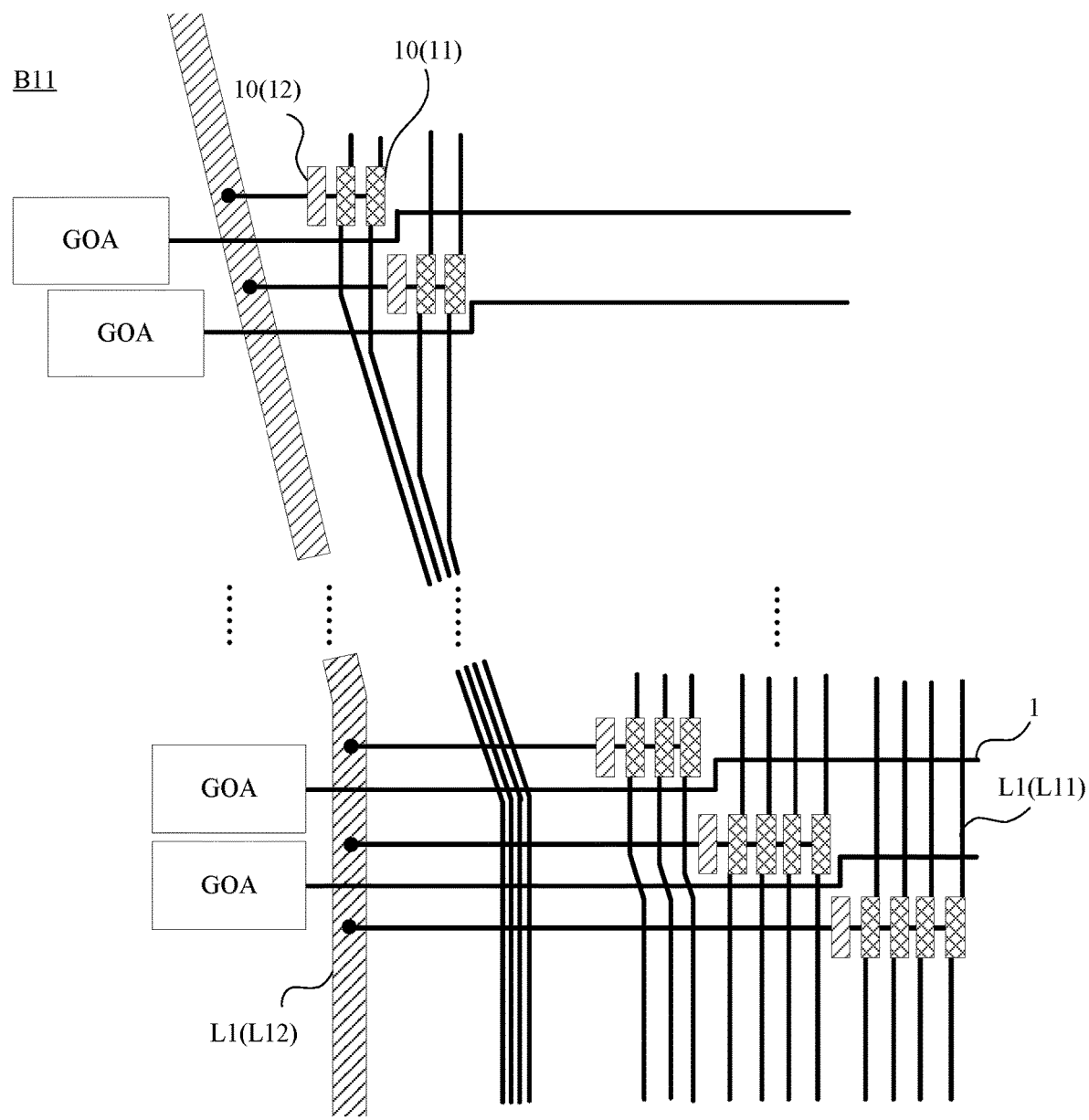
FIG. 1 schematically shows a schematic diagram of a corner of a display substrate in a comparison example.

In order to make objectives, technical solutions and advantages of the present disclosure clearer, the technical solutions of embodiments of the present disclosure will be clearly and completely described below with reference to the accompanying drawings. Obviously, the described embodiments are merely some embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that, in the accompanying drawings, for clarity and/or description purposes, size and relative size of elements may be enlarged. Accordingly, the size and relative size of each element need not to be limited to those shown in the figures. In the specification and the accompanying drawings, the same or similar reference numerals represent the same or similar components.

When an element is described as being "on", "connected to" or "coupled to" another element, the element may be directly on the other element, directly connected to the other element, or directly coupled to the other element, or an intermediate element may be provided. However, when an element is described as being "directly on", "directly connected to" or "directly coupled to" another element, no intermediate element is provided. Other terms and/or expressions used to describe a relationship between elements, such as "between" and "directly between", "adjacent" and "directly adjacent", "on" and "directly on", and so on, should be interpreted in a similar manner. Moreover, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one of X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", may be used herein to describe a relationship between one element or feature and another element or feature as shown in the figures. It should be understood that the spatial relationship terms are intended to cover other different orientations of a device in use or operation in addition to the orientation described in the figures. For example, if a device in the figures is turned upside down, an element or feature described as "below" or "under" another element or feature will be oriented "above" or "on" the other element or feature.

Those skilled in the art should understand that herein, unless otherwise specified, the expression "thickness" refers to a size in a direction perpendicular to a surface of the display panel provided with various film layers, that is, a size in a light exit direction of the display substrate.

Here, unless otherwise specified, the expression "patterning process" generally includes steps of photoresist coating, exposure, development, etching, and photoresist stripping. The expression "one-time patterning process" means a process of forming patterned layers, components, elements and so on by using one mask.

It should be noted that the expressions "the same layer", "arranged in the same layer" or similar expressions refer to a layer structure that is formed by firstly forming, using a same film forming process, a film layer used to form a specific pattern, and then patterning, using one-time patterning process, the film layer with a same mask. Depending on the specific patterns, the one-time patterning process may include plurality of exposure, development or etching processes, and the specific pattern in the formed layer structure may be continuous or discontinuous. These specific patterns may be at different heights or have different thicknesses.

Here, unless otherwise specified, the expression "electrically connected" may mean that two components or elements are directly electrically connected to each other. For example, component or element A is in direct contact with component or element B, and an electrical signal may be transmitted between the two components or elements. It may also mean that two components or elements are electrically connected through a conductive medium such as a conductive wire. For example, component or element A is electrically connected to component or element B through a conductive wire so that an electrical signal is transmitted between the two components or elements. Alternatively, it may also mean that two components or elements are electrically connected through at least one electronic component. For example, component or element A is electrically connected to component or element B through at least one thin film transistor so that an electrical signal is transmitted between the two components or elements.

FIG. 1 schematically shows a schematic diagram of a corner of a display substrate in a comparison example. As shown in FIG. 1, in this comparison example, a display substrate is provided, which includes a display region AA and a corner region B11. A plurality of electrostatic discharge circuits 10 may be provided in the corner region B11. A signal line L1 on the display substrate may be electrically connected to the electrostatic discharge circuit 10 in the corner region B11, so as to discharge static electricity through the electrostatic discharge circuit 10, thereby reducing a damage of the static electricity to an internal structure of the display substrate.

For example, the electrostatic discharge circuit 10 may be a bidirectional electrostatic discharge circuit. The bidirectional electrostatic discharge circuit may refer to a circuit that may achieve a bidirectional electrostatic discharge. For example, the bidirectional electrostatic discharge circuit may be electrically connected to two signal lines L1 on the display substrate. For example, the signal line L1 may include a data signal line L11 and a common voltage signal line L12. The bidirectional electrostatic discharge circuit may discharge the static electricity on one of the two signal lines L1 to the other, so as to achieve the bidirectional electrostatic discharge and prevent an accumulation of static electricity.

For example, a plurality of electrostatic discharge circuits in the corner region B11 may include a plurality of groups of first bidirectional electrostatic discharge units 11. The first bidirectional electrostatic discharge units 11 in a same group are located in a same row, for example, the first bidirectional electrostatic discharge units 11 in the same group are arranged in a horizontal direction in FIG. 1. Each group of first bidirectional electrostatic discharge units 11 includes a plurality of first bidirectional electrostatic discharge units 11, and the first bidirectional electrostatic discharge unit 11 may achieve the bidirectional electrostatic discharge. For example, the first bidirectional electrostatic discharge unit 11 includes a first electrostatic discharge end and a second electrostatic discharge end. The first bidirectional electrostatic discharge unit 11 may discharge the static electricity on the first electrostatic discharge end to the second electrostatic discharge end, and discharge the static electricity on the second electrostatic discharge end to the first electrostatic discharge end. When the first electrostatic discharge end and the second electrostatic discharge end are electrically connected to the two signal lines L1 respectively, the static electricity on one of the two signal lines L1 may be discharged to the other.

Optionally, a second bidirectional electrostatic discharge unit 12 may be added between the first bidirectional electrostatic discharge unit 11 and the signal lines. The second bidirectional electrostatic discharge unit 12 may also achieve a bidirectional electrostatic discharge, so that the first bidirectional electrostatic discharge unit 11 and the second bidirectional electrostatic discharge unit 12 may buffer each other and prevent the two from being broken down. For example, the plurality of electrostatic discharge circuits 10 in the corner region B11 further include a second bidirectional electrostatic discharge unit 12 corresponding to each group of first bidirectional electrostatic discharge units 11. The second bidirectional electrostatic discharge unit 12 may be located in a same row with the corresponding first bidirectional electrostatic discharge unit 11. Optionally, in an $x^{th}$ group of first bidirectional electrostatic discharge units 11, the first electrostatic discharge end of each first bidirectional electrostatic discharge unit 11 is electrically connected to a first signal line L11, and different first bidirectional electrostatic discharge units 11 are electrically connected to different first signal lines L11 respectively; the second electrostatic discharge end of each first bidirectional electrostatic discharge unit 11 is electrically connected to a second bidirectional electrostatic discharge unit 12, and is electrically connected to a second signal line L12 through the second bidirectional electrostatic discharge unit 12, where x is a positive integer.

When a large amount of static electricity is accumulated on the first signal line L11, the first bidirectional electrostatic discharge unit 11 electrically connected to the first signal line L11 may discharge the static electricity on the first signal line L11 to the second bidirectional electrostatic discharge unit 12, and then the static electricity is discharged to the second signal line L12 through the second bidirectional electrostatic discharge unit 12. On the contrary, when a large amount of static electricity is accumulated on the second signal line L12, the second bidirectional electrostatic discharge unit 12 electrically connected to the second signal line L12 may discharge the static electricity on the second signal line L12 to the first bidirectional electrostatic discharge unit 11, and then the static electricity is discharged to the first signal line L11 through the first bidirectional electrostatic discharge unit 11.

However, the second bidirectional electrostatic discharge unit 12 arranged in this manner may occupy a large space, which results in a large corner region B11 of the display substrate and affects a screen-to-body ratio. The screen-to-body ratio may refer to a ratio of an area of the display region AA to an area of the display substrate.

Figure 2:
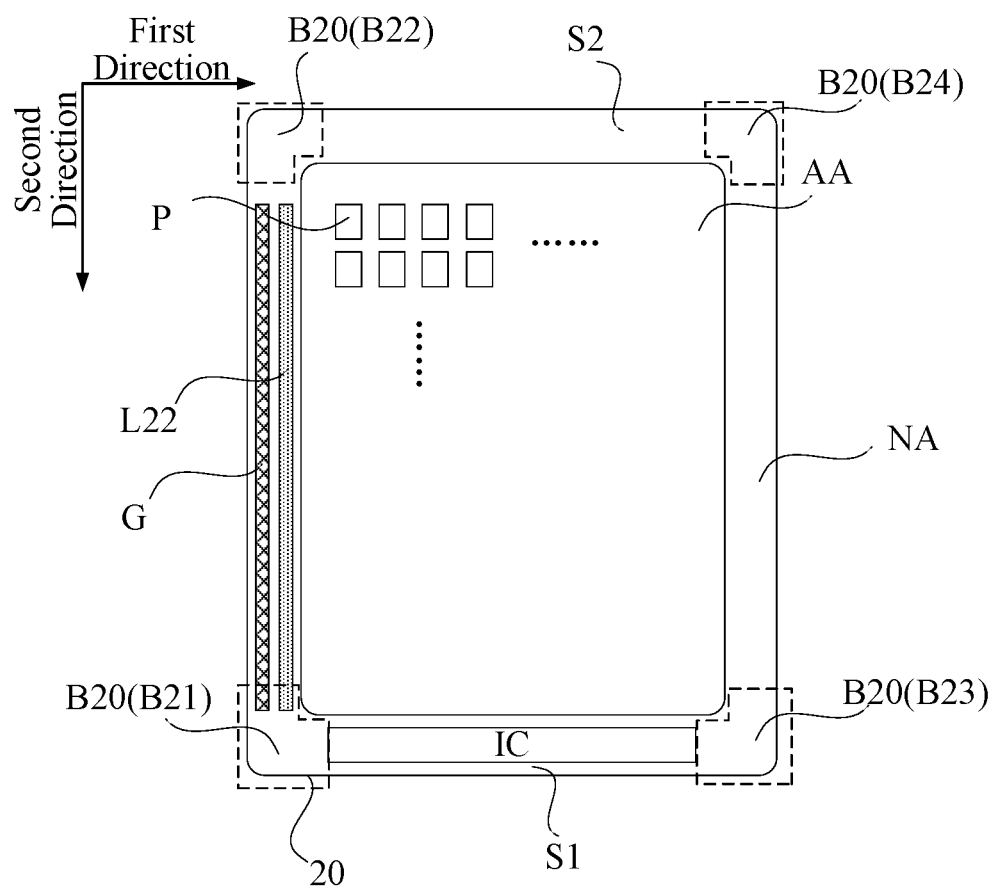
FIG. 2 schematically shows a first plan view of a display substrate in embodiments of the present disclosure.

In view of this, embodiments of the present disclosure provide a display substrate. FIG. 2 schematically shows a first plan view of a display substrate in embodiments of the present disclosure. As shown in FIG. 2, the display substrate in such embodiments includes a display region AA and a non-display region NA at least partially surrounding the display region AA. A plurality of pixel units P arranged in an array in a first direction and a second direction may be provided in the display region AA. The first direction may refer to a row direction of the display substrate, that is, a horizontal direction in FIG. 1. The second direction may refer to a column direction of the display substrate, that is, a vertical direction in FIG. 1.

Optionally, each pixel unit P may include a plurality of sub-pixels, and the plurality of sub-pixels in at least one pixel unit may include sub-pixels of a plurality of colors. For example, at least one pixel unit may include red sub-pixels, green sub-pixels, and blue sub-pixels. For another example, at least one pixel unit includes red sub-pixel, green sub-pixel, blue sub-pixel and white sub-pixel.

A device for providing a driving signal to the sub-pixel may be provided in the non-display region NA. The driving signal includes an electrical signal for driving the sub-pixel to emit light. For example, the driving signal may include a data signal, a scanning signal, and so on. Accordingly, the device that provides the driving signal to the sub-pixel may include a gate driving circuit G and a driving chip IC, and so on. A plurality of gate driving circuits G may be connected in cascade, which may sequentially provide scanning signals. The driving chip IC may include a source driving circuit, which may provide a data signal. For example, the gate driving circuit G may be provided on left and right sides of the non-display region NA in FIG. 2, and the driving chip IC may be provided on a first side S1 of the display substrate, such as a lower end of the non-display region NA in FIG. 2.

In embodiments of the present disclosure, the display substrate includes at least one corner region B20, which may be a region where a corner of the display substrate is located. Optionally, the corner region B20 may be a part of the non-display region NA, and the at least one corner region B20 surrounds at least one corner of the display region AA.

In embodiments of the present disclosure, the number of the corner region B20 is not specifically limited. The number of the corner region B20 may be determined according to an actual shape of the display substrate. For example, as shown in FIG. 2, the display substrate may be substantially a rectangle. In this case, the display substrate may include "upper left", "lower left", "upper right" and "lower right" corner regions (e.g., a first corner region B21, a second corner region B22, a third corner region B23, and a fourth corner region B24). Optionally, the corner of the display substrate may be either a right angle corner or an arc corner. In embodiments of the present disclosure, the corner of the display substrate may be an arc corner, or called an R-shaped corner.

For the sake of clarity, unless otherwise specified, the first corner region B21 is illustrated below by way of example in describing the display substrate of embodiments of the present disclosure. Arrangement solutions and beneficial effects in the other corner regions may be obtained with reference to the first corner region B21, and will not be repeated here.

Figure 3A:
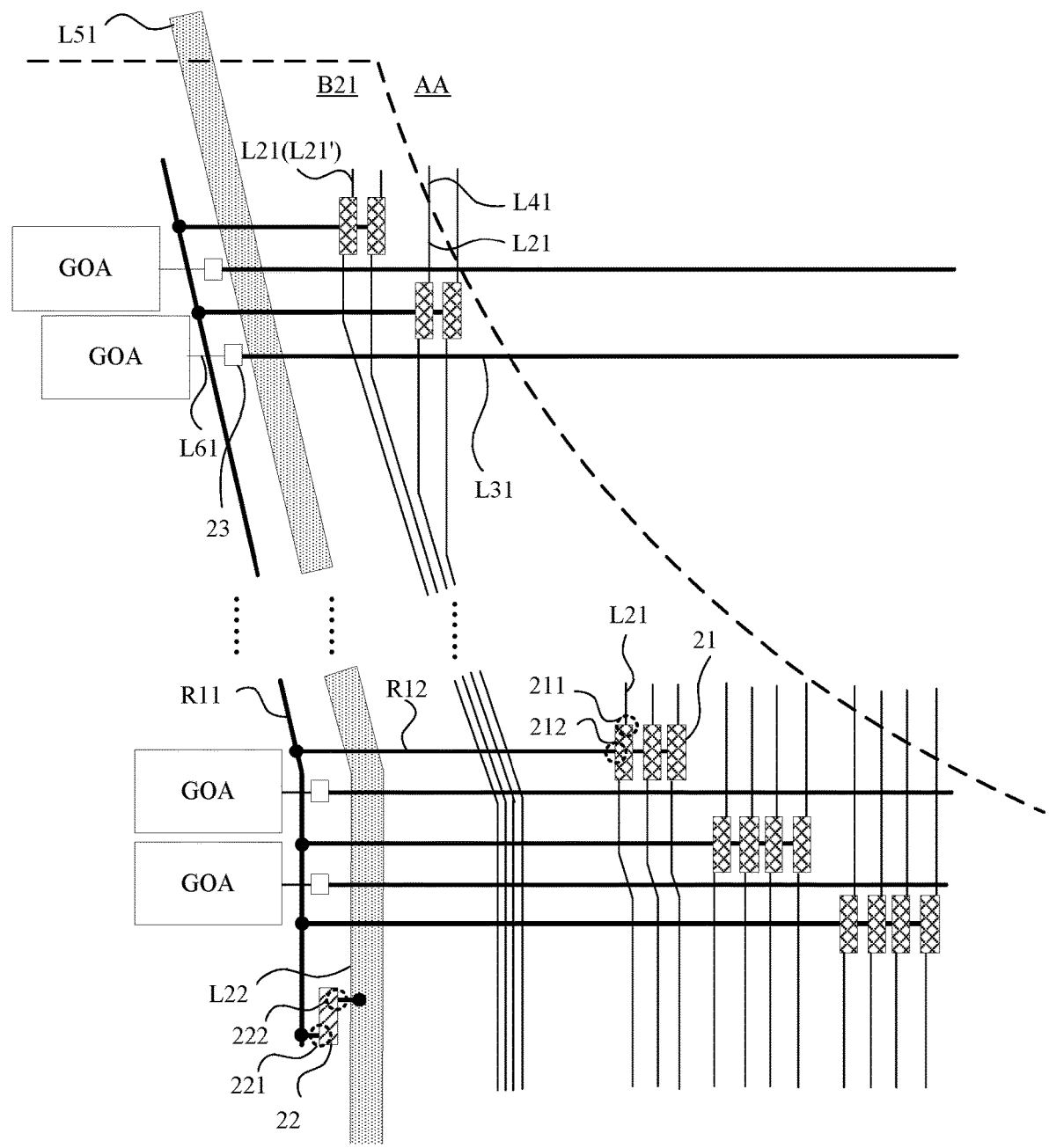
FIG. 3a schematically shows a first partial view of a first corner region in embodiments of the present disclosure.

FIG. 3a schematically shows a first partial view of a first corner region in embodiments of the present disclosure. FIG. 4 schematically shows a wiring diagram of the first corner region in embodiments of the present disclosure. With reference to FIG. 2 to FIG. 4, in at least one corner region (for example, the first corner region B21), the display substrate further includes: a base substrate 20, and a plurality of first signal lines L21, at least one second signal line L22, a plurality of groups of first bidirectional electrostatic discharge units 21 and at least one second bidirectional electrostatic discharge unit 22 that are arranged on the base substrate 20. At least one group of first bidirectional electrostatic discharge units 21 includes at least one first bidirectional electrostatic discharge unit 21. The at least one first bidirectional electrostatic discharge unit 21 includes a first electrostatic discharge end 211 and a second electrostatic discharge end 212. The first electrostatic discharge end 211 of the at least one first bidirectional electrostatic discharge unit 21 is electrically connected to at least one first signal line L21, and the second electrostatic discharge end 212 is electrically connected to at least one second signal line L22 through the at least one second bidirectional electrostatic discharge unit 22.

For example, the plurality of groups of first bidirectional electrostatic discharge units 21 are staggered in the second direction (and/or the first direction). The second electrostatic discharge ends 212 of a same group of first bidirectional electrostatic discharge units 21 may be connected in parallel. For example, the second electrostatic discharge ends 212 of the same group of first bidirectional electrostatic discharge units 21 are connected in parallel on a connecting line, and the connecting line may include a second connecting line R12 described later. The "staggered" may refer to that orthographic projections of the plurality of groups of first bidirectional electrostatic discharge units 21 on the base substrate 20 do not overlap with each other in the second direction (and/or the first direction).

Optionally, the plurality of groups of first bidirectional electrostatic discharge units 21 may be arranged substantially in a third direction, and a group of first bidirectional electrostatic discharge units 21 may be arranged substantially in a fourth direction. The third direction intersects the fourth direction.

Optionally, the third direction is identical with the second direction, and the fourth direction is identical with the first direction.

Optionally, the second electrostatic discharge ends 212 of the first bidirectional electrostatic discharge units 21 are electrically connected to at least one second signal line L22 through a second bidirectional electrostatic discharge unit 22. The second electrostatic discharge ends 212 of the first electrostatic discharge units 21 in a same row may be connected in parallel.

Optionally, one first electrostatic discharge unit 21 is electrically connected to one first signal line L21, and the first electrostatic discharge end 211 of the first electrostatic discharge unit 21 may be connected in parallel with the first signal line L21 electrically connected to the first electrostatic discharge unit 21, so as to prevent the first signal line L21 from being affected when the first electrostatic discharge unit 21 is abnormal.

Optionally, the second bidirectional electrostatic discharge unit 22 includes a third electrostatic discharge end 221 and a fourth electrostatic discharge end 222. The second electrostatic discharge end 212 of the first bidirectional electrostatic discharge unit 21 may be electrically connected to the third electrostatic discharge end 221 of the second bidirectional electrostatic discharge unit 22, and the fourth electrostatic discharge end 222 of the second bidirectional electrostatic discharge unit 22 may be electrically connected to the at least one second signal line L22.

In embodiments of the present disclosure, the first signal line L21 and the second signal line L22 may refer to parts of signal lines at other positions of the display substrate extending to the first corner region B21. For example, the first signal line L21 may include a part of a data line in the display region AA extending to the first corner region B21, and the second signal line L22 may include a part of a common voltage signal line in the non-display region NA extending to the first corner region B21. Optionally, the common voltage signal line here may refer to a common voltage signal bus.

In embodiments of the present disclosure, the first bidirectional electrostatic discharge unit 21 may achieve a bidirectional electrostatic discharge. For example, the first bidirectional electrostatic discharge unit 21 may be used to discharge the static electricity on the first signal line L21 to the second bidirectional electrostatic discharge unit 22, and discharge the static electricity reaching the first bidirectional electrostatic discharge unit 21 via the second bidirectional electrostatic discharge unit 22 to the first signal line L21. The second bidirectional electrostatic discharge unit 22 is connected between the first bidirectional electrostatic discharge unit 21 and the second signal line L22, and the second bidirectional electrostatic discharge unit 22 may also achieve a bidirectional electrostatic discharge function. For example, the second bidirectional electrostatic discharge unit 22 may be used to discharge the static electricity on the second signal line L22 to the first bidirectional electrostatic discharge unit 21, and discharge the static electricity reaching the second bidirectional electrostatic discharge unit 22 via the first bidirectional electrostatic discharge unit 21 to the second signal line L22.

In embodiments of the present disclosure, the second electrostatic discharge ends 212 of at least two groups of first bidirectional electrostatic discharge units 21 are electrically connected to at least one second signal line L22 through a same second bidirectional electrostatic discharge unit 22.

For example, two second bidirectional electrostatic discharge units 22 may be provided. In this case, some groups of first bidirectional electrostatic discharge units 21 may be electrically connected to the second signal line L22 through one of the second bidirectional electrostatic discharge units 22, and the other groups of first bidirectional electrostatic discharge units 21 may be electrically connected to the second signal line L22 through the other of the second bidirectional electrostatic discharge units 22.

For another example, one second bidirectional electrostatic discharge unit 22 may be provided. In this case, all groups of first bidirectional electrostatic discharge units 21 may be electrically connected to the second signal line L22 through the second bidirectional electrostatic discharge unit 22.

With the display substrate of embodiments of the present disclosure, the number of second bidirectional electrostatic discharge unit 22 in the corner region B20 may be greatly reduced, which may help to reduce an area of the corner region B20 and improve the screen-to-body ratio.

The display substrate of embodiments of the present disclosure will be further described below with reference to FIG. 2 to FIG. 10.

In embodiments of the present disclosure, FIG. 3a and FIG. 5 to FIG. 8 schematically show several arrangement solutions for the corner region in embodiments of the present disclosure respectively. One of the arrangement solutions for the corner region in embodiments of the present disclosure will be described below with reference to FIG. 3a to FIG. 4.

In some specific embodiments, the display substrate further includes a display region AA. The at least one corner region B20 surrounds at least one corner of the display region AA. As mentioned above, the display substrate may include four corner regions B20, including the first corner region B21, the second corner region B22, the third corner region B23 and the fourth corner region B24. Each corner region B20 surrounds one corner of the display region AA.

In embodiments of the present disclosure, the at least one first signal line L21 includes a part of a fourth signal line L41 in the display region AA extending to the corner region B20. The at least one second signal line L22 includes a part of a fifth signal line L51 at an edge of the display region AA extending to the corner region B20.

In some specific embodiments, the fourth signal line L41 may include a data line, a scanning (gate) line, etc. in the display region AA. The data line may provide a data signal to the sub-pixel in the display region AA, and the sub-pixel may emit light with corresponding brightness according to the data signal. For example, the scanning line may provide a scanning signal to the sub-pixel in the display region AA, so that the data signal on the data line may be written into the sub-pixel. Optionally, the fourth signal line L41 may also include other signal lines that are arranged in the same layer as the above-mentioned signal lines but achieve different functions. For the sake of clarity, unless otherwise specified, the fourth signal line L41 including the data line in the display region AA is illustrated below by way of example in describing the display substrate of embodiments of the present disclosure.

In some specific embodiments, the first bidirectional electrostatic discharge units 21 correspond to the first signal lines L21 respectively. In other words, each first bidirectional electrostatic discharge unit 21 may be connected to a first signal line L21, and different first bidirectional electrostatic discharge units 21 may be connected to different first signal lines L21, so that static electricity on each first signal line may be discharged through the corresponding first bidirectional electrostatic discharge unit 21, thereby achieving a better effect of electrostatic protection. Moreover, the first signal line L21 includes a part of the data line extending to the corner region B20, and different data lines need to provide data signals independently. The arrangement of the first bidirectional electrostatic discharge units 21 respectively corresponding to the first signal lines L21 may avoid a short circuit between the data lines, thus preventing interference between the data lines.

In some specific embodiments, the fifth signal line L51 may include a common voltage signal (Vcom) line in the non-display region NA. For example, the common voltage signal line may provide a common voltage signal to the sub-pixel in the display region AA, so that the sub-pixel may emit light with corresponding brightness according to the data signal and the common voltage signal. Optionally, the fifth signal line L51 may also include other signal lines that are arranged in the same layer as the above-mentioned signal lines but achieve different functions. For the sake of clarity, unless otherwise specified, the fifth signal line L51 including the common voltage signal line in the non-display region NA is illustrated below by way of example in describing the display substrate of embodiments of the present disclosure.

In embodiments of the present disclosure, the at least one second bidirectional electrostatic discharge unit 22 is electrically connected to the plurality of groups of first bidirectional electrostatic discharge units 21 through a first connecting line R11. An orthographic projection of the first connecting line R11 on the base substrate 20 is located on a side of an orthographic projection of the first signal line L21 on the base substrate 20 close to an orthographic projection of the second signal line L22 on the base substrate 20.

For example, in the first corner region B21, a plurality of first signal lines L21 include a plurality of columns of first signal lines L21 arranged in the first direction, and the orthographic projection of the first connecting line R11 on the base substrate 20 is located on a left side of the orthographic projection of the first signal line L21 closest to a left edge of the display substrate on the base substrate 20.

It should be noted that in embodiments of the present disclosure, the first signal line L21 closest to an edge of the display substrate refers to a first signal line L21 in the first corner region B21 without other first signal lines L21 between the edge of the display substrate and that first signal line L21.

In embodiments of the present disclosure, in the first corner region B21, the display substrate may include a second bidirectional electrostatic discharge unit 22, and the second electrostatic discharge ends 212 of the plurality of groups of first bidirectional electrostatic discharge units 21 are electrically connected to the second signal line L22 through the second bidirectional electrostatic discharge unit 22. Optionally, the second bidirectional electrostatic discharge unit 22 may be arranged at a corner of the first corner region B21, so as to minimize an influence of the second bidirectional electrostatic discharge unit 22 on a wiring layout in the first corner region B21, and thus help to further reduce the area of the first corner region B21.

For example, in FIG. 3a, the second bidirectional electrostatic discharge unit 22 may be arranged at a lower left corner of the first corner region B21, and the second bidirectional electrostatic discharge unit 22 is electrically connected to the second ends of the plurality of groups of first bidirectional electrostatic discharge units 21 through the first connecting line R11 extending upward.

In some specific embodiments, the orthographic projection of the first connecting line R11 on the base substrate 20 may be located on a side of the orthographic projection of the second signal line L22 on the base substrate 20 away from the orthographic projection of the first signal line L21 on the base substrate 20, or between the orthographic projection of the second signal line L22 on the base substrate 20 and the orthographic projection of the first signal line L21 on the base substrate 20.

As shown in FIG. 3a, in some specific embodiments, the orthographic projection of the first connecting line R11 on the base substrate 20 is located on a side of the orthographic projection of the second signal line L22 on the base substrate 20 away from the orthographic projection of the first signal line L21 on the base substrate 20.

For example, in the first corner region B21, the display substrate includes a second signal line L22, and the plurality of first signal lines L21 include a plurality of columns of first signal lines L21 arranged in the first direction. The first signal line L21 closest to the edge of the display substrate among the plurality of columns of first signal lines L21 is a first signal line L21'. The orthographic projection of the first connecting line R11 on the base substrate 20 is located on a side of the orthographic projection of the second signal line L22 on the base substrate 20 away from an orthographic projection of the first signal line L21' on the base substrate 20, that is, in the first corner region B21, the orthographic projection of the first connecting line R11 on the base substrate 20 is located on a left side of the orthographic projection of the second signal line L22 on the base substrate 20.

Figure 3B:
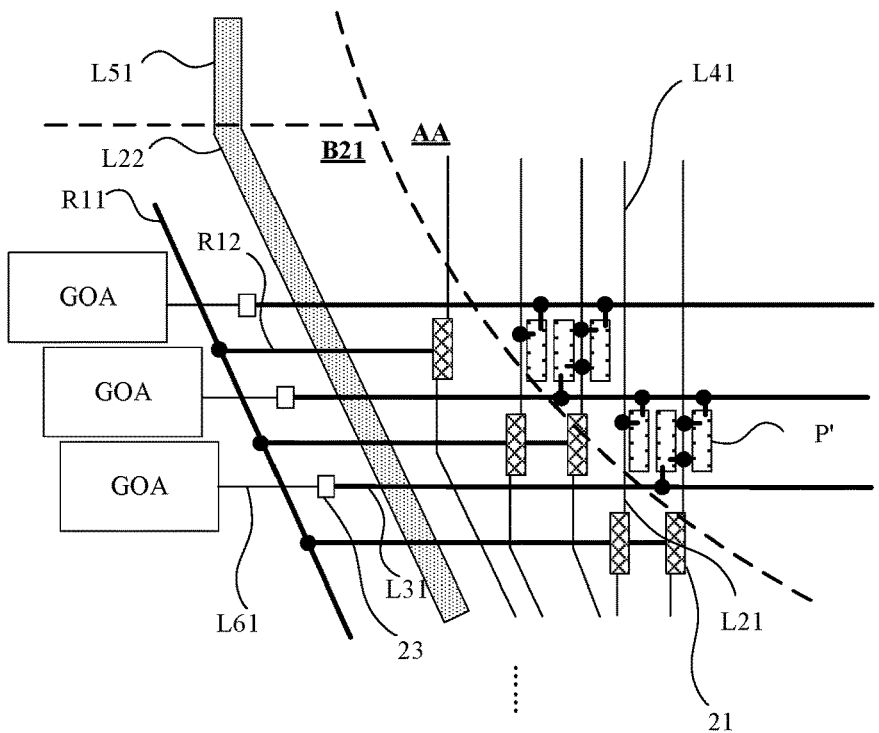
FIG. 3b schematically shows a second partial view of the first corner region in embodiments of the present disclosure.
Figure 4:
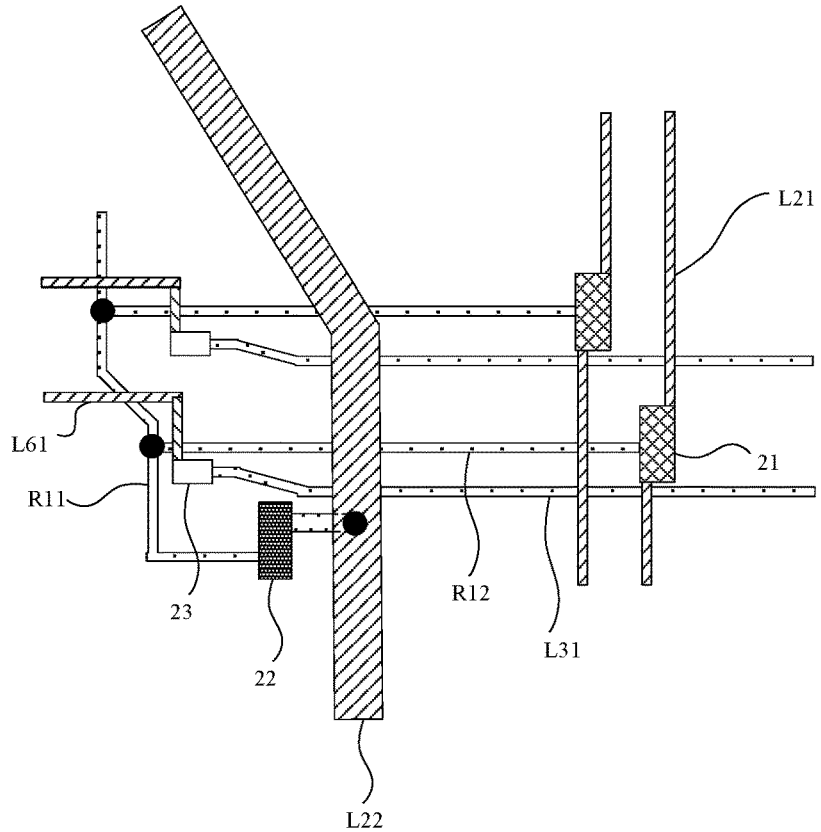
FIG. 4 schematically shows a wiring diagram of the first corner region in embodiments of the present disclosure.

FIG. 3b schematically shows a second partial view of the first corner region in embodiments of the present disclosure, and a part of a sub-pixel P' in the display region AA hidden in FIG. 3a is shown in FIG. 3b. Different from FIG. 3a, in FIG. 3b, the fifth signal line L51 extending to the first corner region B21 may extend substantially in the column direction of the display substrate (for example, the second direction in FIG. 2), and then begin to extend obliquely in a direction of an arc of the corner when approaching the first corner region B21. With reference to FIG. 3a and FIG. 3b, in some specific embodiments, the display substrate further includes a plurality of rows of sub-pixels P' in the display region AA. For example, sub-pixels P' in a row are arranged in the horizontal direction in FIG. 3a, and the plurality of rows of sub-pixels are arranged in the vertical direction in FIG. 3a. In at least one corner region B20 of the display substrate, the display substrate further includes a plurality of third signal lines L31. At least one third signal line L31 has one end electrically connected to a first connecting portion 23, and the other end electrically connected to at least some sub-pixel P' in at least one row of sub-pixel P'. For example, the third signal line L31 may be electrically connected to some sub-pixels P' in a row of sub-pixels P', or to all sub-pixels P' in a row of sub-pixels P'. The first connecting portion 23 is used to electrically connect the third signal line L31 with the gate driving circuit G. The first connecting line R11 is arranged in the same layer as the third signal line L31. An orthographic projection of the first connecting portion 23 on the base substrate 20 is located on a side of the orthographic projection of the first signal line L21 on the base substrate 20 close to the orthographic projection of the second signal line L22 on the base substrate 20.

For example, in the first corner region B21, a third signal line L31 is electrically connected to a shift register GOA of the gate driving circuit G through the first connecting portion 23.

For example, with reference to FIG. 3a and FIG. 3b, in the first corner region B21, the orthographic projection of the first connecting portion 23 on the base substrate 20 may be located on a left side of the orthographic projection of the first signal line L21 on the base substrate 20.

The orthographic projection of the first connecting line R11 on the base substrate 20 is located on a side of the orthographic projection of the first connecting portion 23 on the base substrate 20 away from the orthographic projection of the first signal line L21 on the base substrate 20.

For example, with reference to FIG. 3a and FIG. 3b, in the first corner region B21, the orthographic projection of the first connecting line R11 on the base substrate 20 may be located on a left side of the orthographic projection of the first connecting portion 23 on the base substrate 20.

In embodiments of the present disclosure, the third signal line L31 may include a part of a scanning line in the display region AA extending to the first corner region B21. For example, the shift register GOA may generate the above-mentioned scanning signal, and the scanning signal may be transmitted to the corresponding sub-pixel P' through the first connecting portion 23, the third signal line L31 and the scanning line, so that the data signal may be written to the sub-pixel P'.

Optionally, the first connecting portion 23 may include a transfer portion provided in a via hole. For example, an output end of the shift register GOA may extend towards the display region AA through a sixth signal line L61. The sixth signal line L61 may be located in a different film layer from the third signal line L31. A transfer of the sixth signal line L61 and the third signal line L31 may be achieved through the first connecting portion 23.

In embodiments of the present disclosure, each group of first bidirectional electrostatic discharge units 21 may be electrically connected to the first connecting line R11 through the second connecting line R12, and then achieve an electrical connection with the second bidirectional electrostatic discharge unit 22. Optionally, the second connecting line R12 may extend in the first direction, and an extension direction of the first connecting line R11 may intersect the first direction.

In embodiments of the present disclosure, the first connecting line R11 and the third signal line L31 are arranged in the same layer. Since the orthographic projection of the first connecting line R11 on the base substrate 20 is located on the left side of the orthographic projection of the first connecting portion 23 on the base substrate 20, wires (that is, the first connecting line R11 and the second connecting line R12) between the first bidirectional electrostatic discharge unit 21 and the second bidirectional electrostatic discharge unit 22 may bypass the third signal line L31 and may not conflict with the third signal line L31, so that a short circuit may be prevented.

In some specific embodiments, since the sixth signal line L61 and the third signal line L31 are located in different film layers, the sixth signal line L61 and the first connecting line R11 are also located in different film layers. Then a region where the sixth signal line L61 is located may be reused as a wiring region of the first connecting line R11. For example, the orthographic projection of the first connecting line R11 on the base substrate 20 may intersect an orthographic projection of the sixth signal line L61 on the base substrate 20. In this way, a space utilization rate may be improved, and the area of the corner region B20 may be further reduced.

In some specific embodiments, the orthographic projection of the first connecting portion 23 on the base substrate 20 is located on a side of the orthographic projection of the second signal line L22 on the base substrate 20 away from the orthographic projection of the first signal line L21 on the base substrate 20.

For example, with reference to FIG. 3a and FIG. 3b, in the first corner region B21, the orthographic projection of the first connecting portion 23 on the base substrate 20 may be located on a left side of the orthographic projection of the second signal line L22 on the base substrate 20.

In some specific embodiments, the display substrate further includes a gate metal layer and a metal conductive layer. The first connecting line R11 and the third signal line L31 are located in the gate metal layer, and the second signal line L22 is located in the metal conductive layer.

In embodiments of the present disclosure, the second signal line L22 and the third signal line L31 are located in different film layers, so that the third signal line L31 may cross the second signal line L22 in the first direction to extend towards the display region AA.

In embodiments of the present disclosure, the display substrate further includes a plurality of thin film transistors arranged on the base substrate 20, and the display substrate further includes an active layer. The active layer may include an active portion, which is used to form a first electrode connecting portion, a second electrode connecting portion and a channel portion between the first electrode connecting portion and the second electrode connecting portion of the thin film transistor. The gate metal layer includes a gate portion, which is used to form a gate electrode of the thin film transistor. The gate electrode of the thin film transistor directly faces the channel portion. The metal conductive layer may include a metal conductive portion, which is used to form a first electrode and a second electrode of the thin film transistor. The first electrode of the thin film transistor is electrically connected to the first electrode connecting portion, and the second electrode is electrically connected to the second electrode connecting portion.

In embodiments of the present disclosure, the display substrate further includes insulating layers between the above-mentioned film layers, for example, a gate insulating layer between the active layer and the gate metal layer, a first insulating layer between the gate metal layer and the metal conductive layer, and so on.

Optionally, the active layer may contain a semiconductor material. The metal conductive layer and the gate metal layer may contain a metal material, such as Mo, Al, Cu and other metals and their alloys, or materials such as Ti/Al/Ti.

Optionally, the above-mentioned insulating layer may include a single-layer film structure or a stacked-layer film structure. One or more of the above-mentioned insulating layers may contain an inorganic insulating material, an organic insulating material or any combination thereof. For example, the inorganic insulating material may include silicon oxide, silicon nitride, silicon oxynitride, and so on, and the organic insulating material may include polyimide, polyamide, acrylic resin, phenolic resin, benzocyclobutene, and so on.

Figure 5:
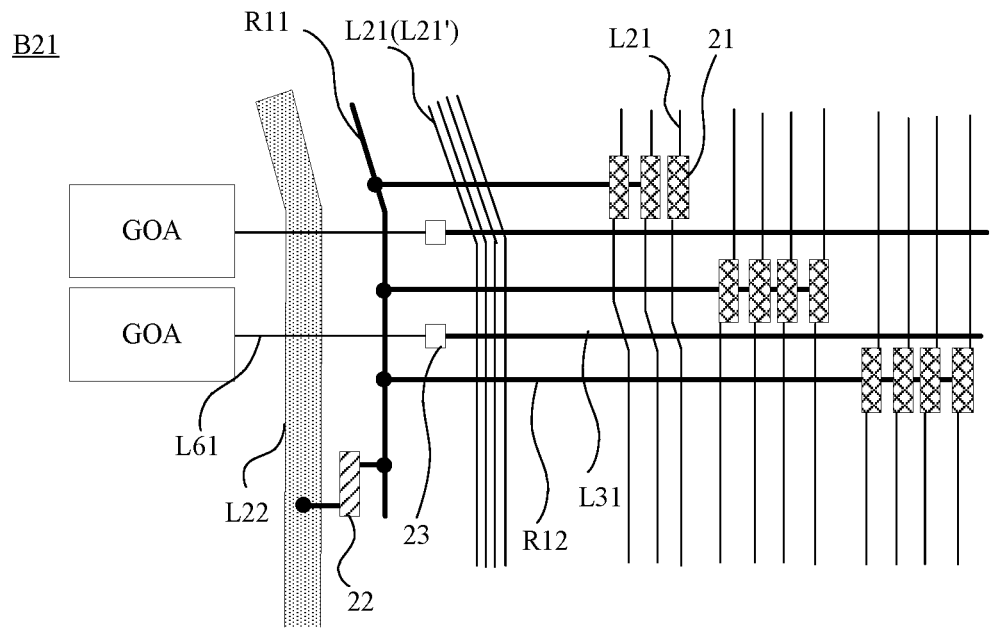
FIG. 5 schematically shows a third partial view of the first corner region in embodiments of the present disclosure.

FIG. 5 schematically shows a third partial view of the first corner region in embodiments of the present disclosure. Another arrangement solution for the corner region in embodiments of the present disclosure will be described below with reference to FIG. 5. It should be noted that a main difference between the arrangement solution shown in FIG. 5 (and FIG. 6 to FIG. 8 to be mentioned below) and the arrangement solution shown in FIG. 3a is placement positions of the second electrostatic discharge unit 22 and the first connecting line R11. For the sake of clarity, only parts closely related to the second electrostatic discharge unit 22 and the first connecting line R11 in the corner region are shown in FIG. 5 to FIG. 8, and details for other parts may refer to FIG. 3a and FIG. 3b.

As shown in FIG. 5, in some specific embodiments, the orthographic projection of the first connecting line R11 on the base substrate 20 is located between the orthographic projection of the second signal line L22 on the base substrate 20 and the orthographic projection of the first signal line L21 on the base substrate 20.

For example, in the first corner region B21, the display substrate includes a second signal line L22, and a plurality of first signal lines L21 includes a plurality of columns of first signal lines L21 arranged in the first direction. The first signal line L21 closest to the left edge of the display substrate among the plurality of columns of first signal lines L21 is a first signal line L21'. An orthographic projection of the first connecting line R11 on the base substrate 20 is located between the orthographic projection of the second signal line L22 on the base substrate 20 and an orthographic projection of the first signal line L21' on the base substrate 20.

In some specific embodiments, in the display region AA, the display substrate further includes a plurality of rows of sub-pixels P'. In at least one corner region B20 of the display substrate, the display substrate further includes a plurality of third signal lines L31. At least one third signal line L31 has one end electrically connected to the first connecting portion 23, and the other end electrically connected to at least some sub-pixels P' in at least one row of sub-pixels P'. For example, the third signal line L31 may be electrically connected to some sub-pixels P' in a row of sub-pixels P', or to all sub-pixels P' in a row of sub-pixels P'. The first connecting portion 23 is used to electrically connect the third signal line L31 with the gate driving circuit G. The first connecting line R11 and the second signal line L22 are arranged in the same layer, and the first connecting line R11 is located between the orthographic projection of the first connecting portion 23 on the base substrate 20 and the orthographic projection of the second signal line L22 on the base substrate 20.

For example, in the first corner region B21, one third signal line L31 is electrically connected to one shift register GOA of the gate driving circuit G through the first connecting portion.

For example, as shown in FIG. 5, in the first corner region B21, the first connecting line R11 is located on a left side of the orthographic projection of the first connecting portion 23 on the base substrate 20.

In embodiments of the present disclosure, in the first corner region B21, since the orthographic projection of the first connecting line R11 on the base substrate 20 is still located on the left side of the orthographic projection of the first connecting portion 23 on the base substrate 20, the wires between the first bidirectional electrostatic discharge unit 21 and the second bidirectional electrostatic discharge unit 22 may also bypass the third signal line L31, so that a short circuit may be prevented.

In some specific embodiments, the orthographic projection of the first connecting portion 23 on the base substrate 20 is located between the orthographic projection of the second signal line L22 on the base substrate 20 and the orthographic projection of the first signal line L21 on the base substrate 20. For example, the orthographic projection of the first connecting portion 23 on the base substrate 20 is located between the orthographic projection of the second signal line L22 on the base substrate 20 and the orthographic projection of the first signal line L21' on the base substrate 20.

In embodiments of the present disclosure, the first connecting line R11, the second signal line L22 and the third signal line L31 may be arranged in the same layer, and the sixth signal line L61 is arranged in a different layer from the first connecting line R11, the second signal line L22 and the third signal line L31, so that the sixth signal line L61 may cross the second signal line L22 to extend towards the display region AA. The third signal line L31 is transferred to the sixth signal line L61 through the first connecting portion 23.

In some specific embodiments, the display substrate further includes a gate metal layer. The first connecting line R11, the second signal line L22 and the third signal line L31 are all located in the gate metal layer. In embodiments of the present disclosure, detailed descriptions of the gate metal layer may refer to the above-mentioned embodiments, and will not be repeated here.

In some specific embodiments, the orthographic projection of the second bidirectional electrostatic discharge unit 22 on the base substrate 20 is located between the orthographic projection of the first connecting line R11 on the base substrate 20 and the orthographic projection of the second signal line L22 on the base substrate 20.

For example, in the corner region B20, the display substrate includes a second bidirectional electrostatic discharge unit 22. Optionally, as shown in FIG. 3a, in the first corner region B21, when the orthographic projection of the second bidirectional electrostatic discharge unit 22 on the base substrate 20 is located between the orthographic projection of the first connecting line R11 on the base substrate 20 and the orthographic projection of the second signal line L22 on the base substrate 20, the orthographic projection of the second bidirectional electrostatic discharge unit 22 on the base substrate 20 may be located on a left side of the orthographic projection of the second signal line L22 on the base substrate 20. Optionally, as shown in FIG. 5, in the first corner region B21, when the orthographic projection of the second bidirectional electrostatic discharge unit 22 on the base substrate 20 is located between the orthographic projection of the first connecting line R11 on the base substrate 20 and the orthographic projection of the second signal line L22 on the base substrate 20, the orthographic projection of the second bidirectional electrostatic discharge unit 22 on the base substrate 20 may be located on a right side of the orthographic projection of the second signal line L22 on the base substrate 20.

Optionally, the second electrostatic discharge unit 22 may be located at a lower end of the first corner region B21, so that the second bidirectional electrostatic discharge unit 22 may be located at a corner of the first corner region B21, thus further weakening the influence of the second bidirectional electrostatic discharge unit 22 on the wiring layout in the first corner region B21.

In some specific embodiments, the orthographic projection of the second bidirectional electrostatic discharge unit 22 on the base substrate 20 is located on a side of an orthographic projection of an $x^{th}$ group of first bidirectional electrostatic discharge units 21 on the base substrate 20 away from the center of the display substrate. The $x^{th}$ group of first bidirectional electrostatic discharge units 21 includes a group of first bidirectional electrostatic discharge units 21 farthest from the center of the display substrate, where x is a positive integer.

For example, as shown in FIG. 3a, in the first corner region B21, the $x^{th}$ group of first bidirectional electrostatic discharge units 21 is a last row of first bidirectional electrostatic discharge units 21. The second bidirectional electrostatic discharge unit 22 is located at a lower end of the last row of first bidirectional electrostatic discharge units 21.

Figure 6:
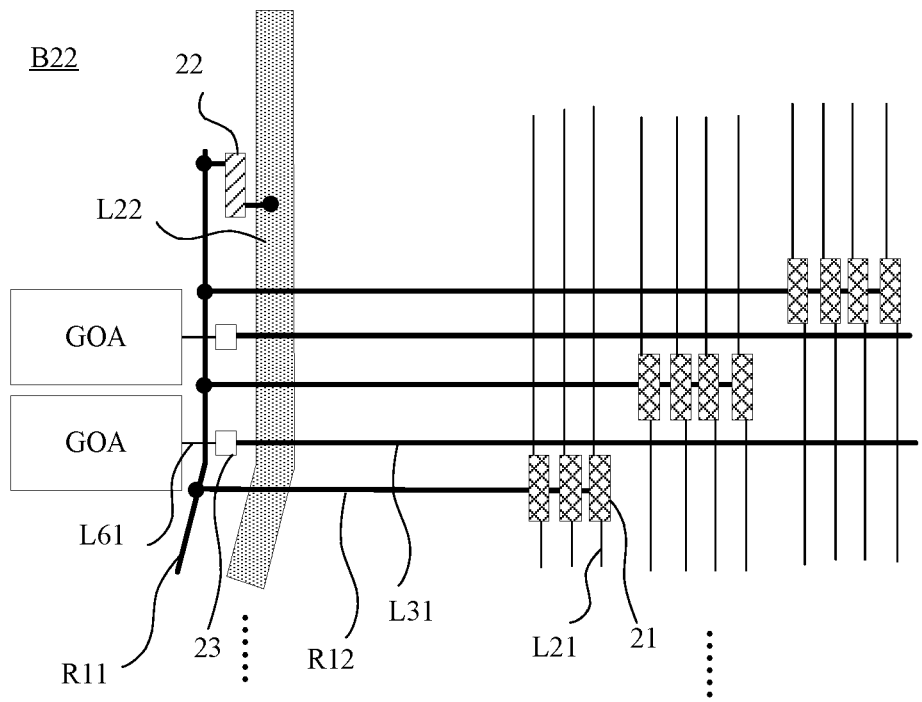
FIG. 6 schematically shows a partial view of a second corner region in embodiments of the present disclosure.

For example, FIG. 6 schematically shows a partial view of a second corner region in embodiments of the present disclosure. As shown in FIG. 6, in the second corner region B22, the $x^{th}$ group of first bidirectional electrostatic discharge units 21 is a first row of first bidirectional electrostatic discharge units 21. The second bidirectional electrostatic discharge unit 22 is located at an upper end of the first row of first bidirectional electrostatic discharge units 21.

With reference to FIG. 3a to FIG. 6, in some specific embodiments, one second bidirectional electrostatic discharge unit 22 is provided, and the second electrostatic discharge ends 212 of the plurality of first bidirectional electrostatic discharge units 21 are electrically connected to the at least one second signal line L22 through the second bidirectional electrostatic discharge unit 22. In this way, it is only needed to provide one second bidirectional electrostatic discharge unit 22 in the corner region B20, so as to minimize the number of second bidirectional electrostatic discharge unit 22, which may help to further reduce the area of the corner region B20.

In some specific embodiments, the orthographic projection of the third signal line L31 on the base substrate 20 is substantially a straight line.

Optionally, the third signal line L31 is located in the same row as the gate driving circuit G electrically connected to the third signal line L31. For example, the orthographic projections of the two on the base substrate 20 extend substantially in a shape of a straight line in a predetermined direction. The predetermined direction may include the row direction of the display substrate (for example, the first direction in FIG. 2).

As shown in FIG. 1, in this comparison example, since the second bidirectional electrostatic discharge unit 22 occupies a large space, the third signal line L31 needs to bend when passing through the second bidirectional electrostatic discharge unit 22, which may lead to an increase in resistance.

With reference to FIG. 3a to FIG. 6, in embodiments of the present disclosure, the number of second bidirectional electrostatic discharge unit 22 in the corner region B20 may be reduced by the solutions in the above-mentioned embodiments, so that the third signal line L31 may extend along a straight line as far as possible, a length of the signal line may be reduced, and thus the resistance on the third signal line L31 may be reduced.

In some specific embodiments, the orthographic projection of at least one group of first bidirectional electrostatic discharge units 21 on the base substrate 20 is located between the orthographic projections of two adjacent third signal lines L31 on the base substrate 20.

In embodiments of the present disclosure, since the third signal line L31 may be substantially a straight line, when the orthographic projection of the first bidirectional electrostatic discharge unit 21 on the base substrate 20 is located between the orthographic projections of two adjacent third signal lines L31 on the base substrate 20, the first bidirectional electrostatic discharge unit 21 may be located in the same row as the corresponding sub-pixel P' in the display region AA, which may help to simplify the preparation process.

With reference to FIG. 2 to FIG. 6, in some specific embodiments, the display substrate includes a first side S1 for providing a source driving circuit and a second side S2 opposite to the first side S1. The at least one corner region B20 of the display substrate includes the first corner region B21 on the first side and the second corner region B22 on the second side. In both the first corner region B21 and the second corner region B22, the display substrate includes a plurality of groups of first bidirectional electrostatic discharge units 21 and at least one second bidirectional electrostatic discharge unit 22, and the first signal line L21 electrically connected to the first bidirectional electrostatic discharge unit 21 in the first corner region B21 is different from the first signal line L21 electrically connected to the first bidirectional electrostatic discharge unit 21 in the second corner region B22.

As shown in FIG. 2, in addition to the first corner region B21 and the second corner region B22, the display substrate further includes the third corner region B23 and the fourth corner region B24. The first corner region B21 and the third corner region B23 are located on the first side S1 of the display substrate, and the second corner region B22 and the fourth corner region B24 are located on the second side S2 of the display substrate.

In embodiments of the present disclosure, the plurality of groups of first bidirectional electrostatic discharge units 21 and the at least one second bidirectional electrostatic discharge unit 22 may be arranged in any number of corner regions B20 in the display substrate.

For example, as shown in FIG. 3a, a plurality of groups of first bidirectional electrostatic discharge units 21 and a second bidirectional electrostatic discharge unit 22 may be arranged in the first corner region B21 in the display substrate. Accordingly, a plurality of groups of first bidirectional electrostatic discharge units 21 and a second bidirectional electrostatic discharge unit 22 may be arranged in the third corner region B23 in the display substrate.

For example, as shown in FIG. 6, a plurality of groups of first bidirectional electrostatic discharge units 21 and a second bidirectional electrostatic discharge unit 22 may be arranged in the second corner region B22 of the display substrate. Accordingly, a plurality of groups of first bidirectional electrostatic discharge units 21 and a second bidirectional electrostatic discharge unit 22 may be arranged in the fourth corner region B24 of the display substrate.

Figure 7:
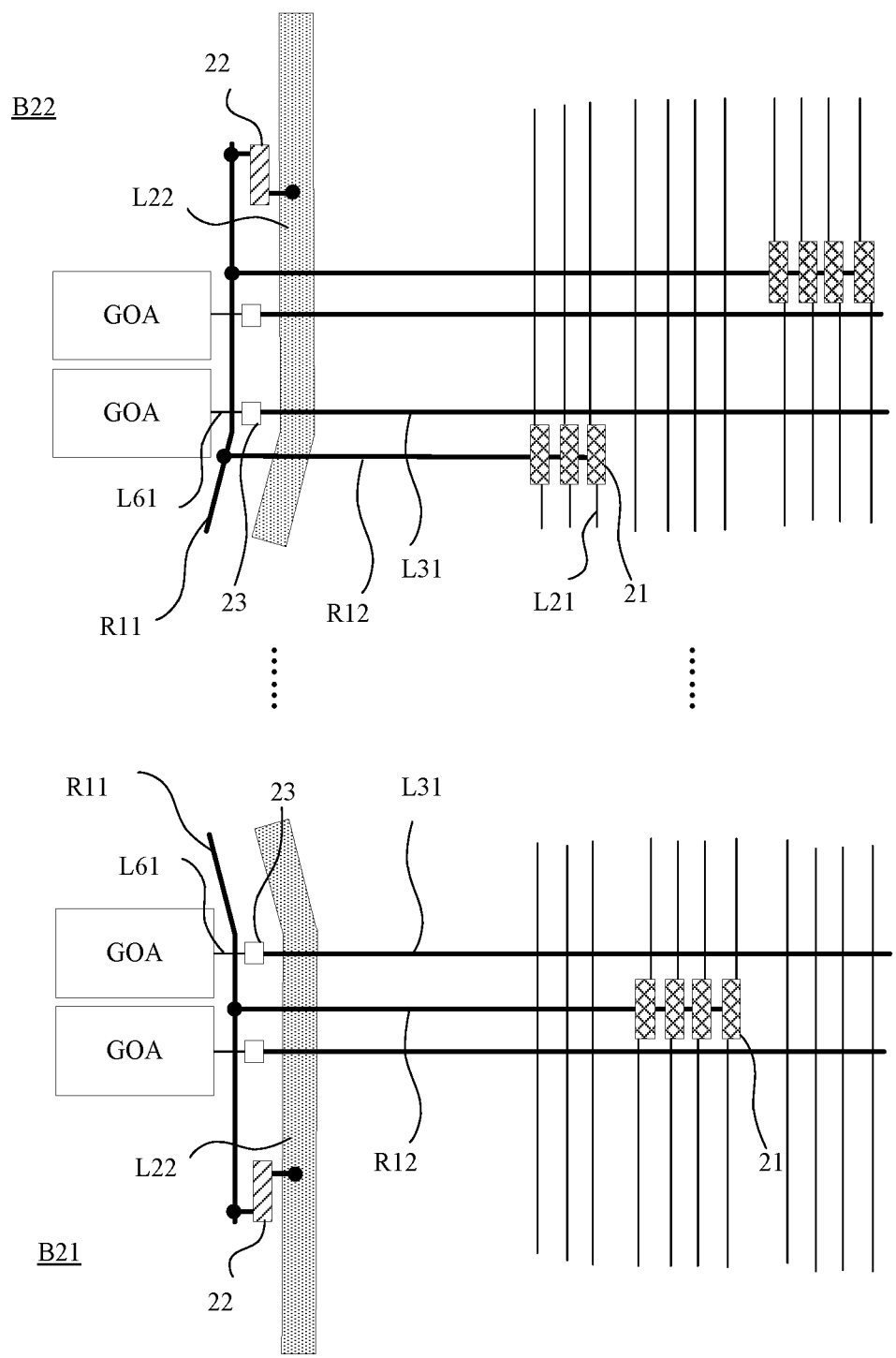
FIG. 7 schematically shows a partial view of the first corner region and the second corner region in embodiments of the present disclosure.

For another example, FIG. 7 schematically shows a partial view of the first corner region and the second corner region in embodiments of the present disclosure. As shown in FIG. 7, all corner regions B20 in the display substrate may be provided with a plurality of groups of first bidirectional electrostatic discharge units 21 and a second bidirectional electrostatic discharge unit 22.

In embodiments of the present disclosure, the specific corner region 20 in which the first bidirectional electrostatic discharge units 21 and the second bidirectional electrostatic discharge unit 22 are arranged may be specially determined according to actual needs, and is not limited here.

It should be noted that the arrangements of the first bidirectional electrostatic discharge units 21 and the second bidirectional electrostatic discharge units 22 in the second corner region B22, the third corner region B23 and the fourth corner region B24 may refer to the previous embodiments. For example, when the second bidirectional electrostatic discharge unit 22 in the first corner region B21 is at the lower left corner, the second bidirectional electrostatic discharge unit 22 in the second corner region B22 may be at the upper left corner, the second bidirectional electrostatic discharge unit 22 in the third corner region B23 may be at the lower right corner, the second bidirectional electrostatic discharge unit 22 in the fourth corner region B24 may be at the upper right corner, and so on, which will not be described in detail here.

In some specific embodiments, the orthographic projections of two adjacent groups of first bidirectional electrostatic discharge units 21 on the base substrate 20 are separated by the orthographic projections of the plurality of third signal lines L31 on the base substrate 20.

As shown in FIG. 7, in embodiments of the present disclosure, when each corner region B20 of the display substrate is provided with a plurality of groups of first bidirectional electrostatic discharge units 21 and at least one second bidirectional electrostatic discharge unit 22, the number of first bidirectional electrostatic discharge units 21 in each corner region B20 may be reduced by electrically connecting the first bidirectional electrostatic discharge unit 21 in the first corner region B21 to a first signal line L21 different from the first signal line L21 electrically connected to the first bidirectional electrostatic discharge unit 21 in the second corner region B22, so as to improve the wiring space in each corner region B20.

For example, the orthographic projections of two adjacent groups of first bidirectional electrostatic discharge units 21 on the base substrate 20 may be separated by the orthographic projections of two third signal lines L31 on the base substrate 20. Compared with the solution shown in FIG. 3a, the number of groups of the first bidirectional electrostatic discharge units 21 in each corner region B20 may be reduced by half, so that the wiring space in each corner region B20 may be further improved.

Figure 8:
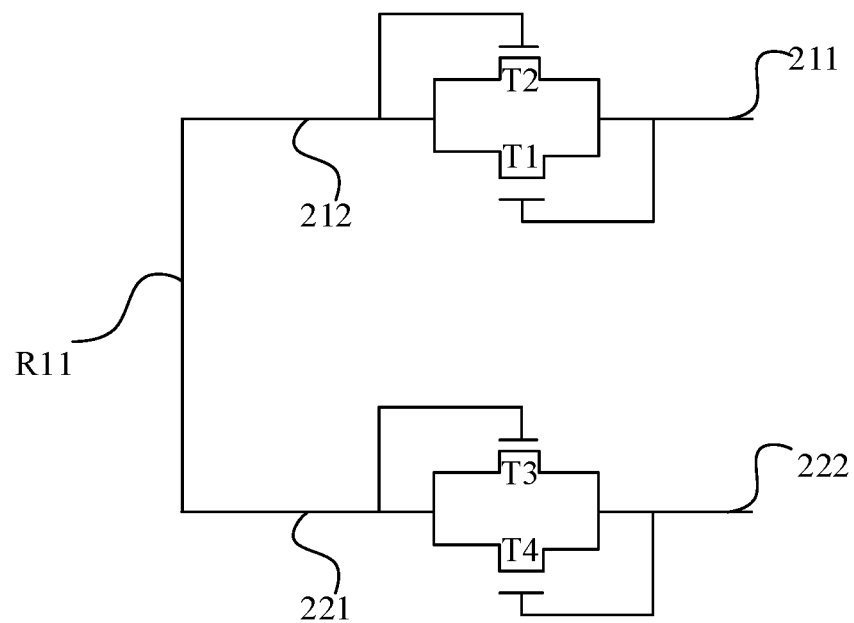
FIG. 8 schematically shows an equivalent circuit diagram of a first bidirectional electrostatic discharge unit and a second bidirectional electrostatic discharge unit in embodiments of the present disclosure.

FIG. 8 schematically shows an equivalent circuit diagram of the first bidirectional electrostatic discharge unit and the second bidirectional electrostatic discharge unit in embodiments of the present disclosure. As shown in FIG. 8, in some specific embodiments, the first bidirectional electrostatic discharge unit 21 includes a first transistor T1 and a second transistor T2, and the second bidirectional electrostatic discharge unit 22 includes a third transistor T3 and a fourth transistor T4. A gate electrode of the first transistor T1, a first electrode of the first transistor T1 and a second electrode of the second transistor T2 are electrically connected to the first signal line L21. For example, the gate electrode of the first transistor T1, the first electrode of the first transistor T1 and the second electrode of the second transistor T2 form the first electrostatic discharge end 211 of the first bidirectional electrostatic discharge unit 21, and are then electrically connected to the first signal line L21. A second electrode of the first transistor T1, a first electrode of the second transistor T2 and a gate electrode of the second transistor T2 are electrically connected to a first end of the first connecting line R11. For example, the second electrode of the first transistor T1, the first electrode of the second transistor T2 and the gate electrode of the second transistor T2 form the second electrostatic discharge end 212 of the first bidirectional electrostatic discharge unit 21, and are then electrically connected to the first connecting line R11. A first electrode of the third transistor T3, a gate electrode of the third transistor T3 and a second electrode of the fourth transistor T4 are electrically connected to a second end of the first connecting line R11. For example, the first electrode of the third transistor T3, the gate electrode of the third transistor T3 and the second electrode of the fourth transistor T4 form the third electrostatic discharge end 221 of the second bidirectional electrostatic discharge unit 22, and are then electrically connected to the first connecting line R11.

A second electrode of the third transistor T3, a first electrode of the fourth transistor T4 and a gate electrode of the fourth transistor T4 are electrically connected to the second signal line L22. For example, the second electrode of the third transistor T3, the first electrode of the fourth transistor T4 and the gate electrode of the fourth transistor T4 form the fourth electrostatic discharge end 222 of the second bidirectional electrostatic discharge unit 22, and are then electrically connected to the second signal line L22.

In embodiments of the present disclosure, in a case of a large amount of static electricity on the first signal line L21, the second transistor T2 of the first bidirectional electrostatic discharge unit 21 is turned on, and the static electricity on the first signal line L21 is transferred to the second bidirectional electrostatic discharge unit 22 through the second transistor T2 and the first connecting line R11. At this time, the fourth transistor T4 of the second bidirectional electrostatic discharge unit 22 is turned on, and the static electricity is discharged to the second signal line L22 through the fourth transistor T4. Accordingly, in a case of a large amount of static electricity on the second signal line L22, the third transistor T3 of the second bidirectional electrostatic discharge unit 22 is turned on, and the static electricity on the second signal line L22 is transferred to the first bidirectional electrostatic discharge unit 21 through the third transistor T3 and the first connecting line R11. At this time, the first transistor T1 of the first bidirectional electrostatic discharge unit 21 is turned on, and the static electricity is discharged to the first signal line L21 through the first transistor T1.

Figure 9:
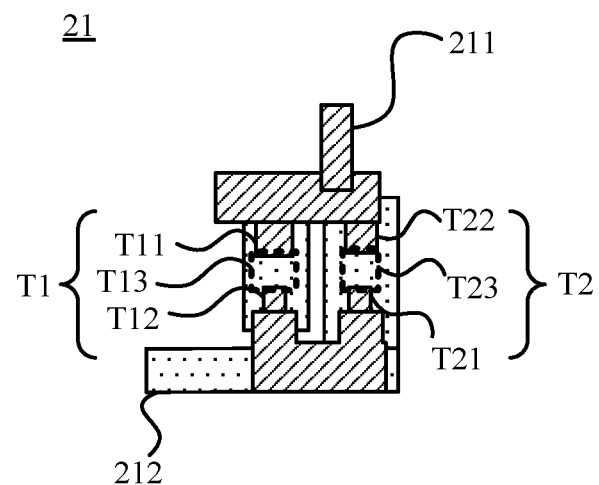
FIG. 9 schematically shows a plan view of the first bidirectional electrostatic discharge unit in embodiments of the present disclosure.

FIG. 9 schematically shows a plan view of the first bidirectional electrostatic discharge unit in embodiments of the present disclosure. As shown in FIG. 9, in embodiments of the present disclosure, a first electrode T11 of the first transistor T1, a second electrode T12 of the first transistor T1, a first electrode T21 of the second transistor T2 and a second electrode T22 of the second transistor T2 are located in the metal conductive layer, and a gate electrode T13 of the first transistor T1 and a gate electrode T23 of the second transistor T2 are located in the gate metal layer. The first electrode T11 and the gate electrode T13 of the first transistor T1 may be electrically connected through a via hole, and the first electrode T21 and the gate electrode T23 of the second transistor T2 may be electrically connected through a via hole. It should be noted that for the sake of clarity, the active layer is not shown in FIG. 9. However, it should be understood that the active layer includes an active portion of the first transistor T1 and an active portion of the second transistor T2. The active portion includes a first electrode connecting portion electrically connected to the first electrode of the transistor, a second electrode connecting portion electrically connected to the second electrode of the transistor, and a channel portion between the first electrode connecting portion and the second electrode connecting portion. The channel portion of the first transistor T1 and the channel portion of the second transistor T2 may directly face the gate electrodes thereof.

In embodiments of the present disclosure, a planar structure of the second bidirectional electrostatic discharge unit 22 may be similar to that of the first bidirectional electrostatic discharge unit 21 or may be obtained through a simple change, as long as the equivalent circuit shown in FIG. 8 may be achieved, and details will not be described here.

It should be noted that in embodiments of the present disclosure, FIG. 9 does not constitute a limitation on the structure of the first bidirectional electrostatic discharge unit. The planar structure of the first bidirectional electrostatic discharge unit 21 may also take other forms, as long as the function of bidirectional electrostatic discharge may be achieved, and details will not be listed here.

It should also be noted that, since the above-mentioned embodiments are described mainly by taking the first corner region B21 as an example, it should be understood that when other corner regions adopt the same or similar layout solutions as the first corner region B21, the beneficial effects in the first corner region B21 described above also apply to these corner regions.

Figure 10:
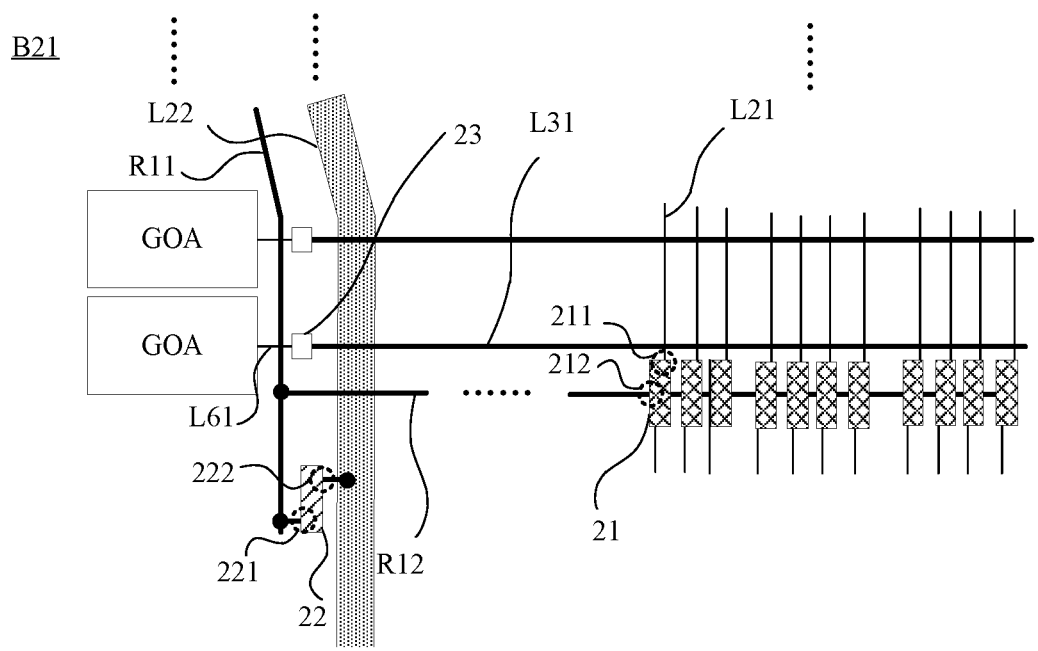
FIG. 10 schematically shows a fourth partial view of the first corner region in embodiments of the present disclosure.

Embodiments of the present disclosure further provide a display substrate. FIG. 10 schematically shows a fourth partial view of the first corner region in embodiments of the present disclosure. With reference to FIG. 2 and FIG. 10, in at least one corner region (for example, the first corner region B21), the display substrate further includes: a base substrate 20, and a plurality of first signal lines L21, at least one second signal line L22, a group of first bidirectional electrostatic discharge units 21 and a second bidirectional electrostatic discharge unit 22 that are arranged on the base substrate. The group of first bidirectional electrostatic discharge units 21 includes at least one first bidirectional electrostatic discharge unit 21. The at least one first bidirectional electrostatic discharge unit 21 includes a first electrostatic discharge end 211 and a second electrostatic discharge end 212. The first electrostatic discharge end 211 of at least one first bidirectional electrostatic discharge unit 21 is electrically connected to at least one first signal line L21, and the second electrostatic discharge end 212 is electrically connected to the at least one second signal line L22 through the second bidirectional electrostatic discharge unit 22.

Optionally, one first electrostatic discharge unit 21 is electrically connected to one first signal line L21. The first electrostatic discharge end 211 of the first electrostatic discharge unit 21 may be connected in parallel with the first signal line L21 electrically connected to the first electrostatic discharge unit 21, so as to prevent the first signal line L21 from being affected when the first electrostatic discharge unit 21 is abnormal.

Optionally, the second bidirectional electrostatic discharge unit 22 includes a third electrostatic discharge end 221 and a fourth electrostatic discharge end 222. The second electrostatic discharge end 212 of the first bidirectional electrostatic discharge unit 21 may be electrically connected to the third electrostatic discharge end 221 of the second bidirectional electrostatic discharge unit 22, and the fourth electrostatic discharge end 222 of the second bidirectional electrostatic discharge unit 22 may be electrically connected to the at least one second signal line L22.

In embodiments of the present disclosure, the first signal line L21 and the second signal line L22 may refer to parts of signal lines at other positions of the display substrate extending to the first corner region B21. For example, the first signal line L21 may include a part of a data line in the display region AA extending to the first corner region B21, and the second signal line L22 may include a part of a common voltage signal line in the non-display region NA extending to the first corner region B21. Optionally, the common voltage signal line here may refer to a common voltage signal bus.

In embodiments of the present disclosure, each first bidirectional electrostatic discharge unit 21 may be connected to a first signal line L21, and different first bidirectional electrostatic discharge units 21 may be connected to different first signal lines L21. The first bidirectional electrostatic discharge unit 21 may achieve a bidirectional electrostatic discharge function. For example, the first bidirectional electrostatic discharge unit 21 may be used to discharge the static electricity on the first signal line L21 to the second bidirectional electrostatic discharge unit 22, and discharge the static electricity reaching the first bidirectional electrostatic discharge unit 21 via the second bidirectional electrostatic discharge unit 22 to the first signal line L21. The second bidirectional electrostatic discharge unit 22 is connected between the first bidirectional electrostatic discharge unit 21 and the second signal line L22, and the second bidirectional electrostatic discharge unit 22 may also achieve a bidirectional electrostatic discharge function. For example, the second bidirectional electrostatic discharge unit 22 may be used to discharge the static electricity on the second signal line L22 to the first bidirectional electrostatic discharge unit 21, and discharge the static electricity reaching the second bidirectional electrostatic discharge unit 22 via the first bidirectional electrostatic discharge unit 21 to the second signal line L22.

With the display substrate of embodiments of the present disclosure, the number of second bidirectional electrostatic discharge unit 22 in the corner region B20 may be greatly reduced, which may help to reduce the area of the corner region B20 and improve the screen-to-body ratio.

In some specific embodiments, the orthographic projection of the second bidirectional electrostatic discharge unit 22 on the base substrate 20 is located on a side of the orthographic projection of the first bidirectional electrostatic discharge unit 21 on the base substrate 20 away from the center of the display substrate. In this way, it is only needed to provide one row of first bidirectional electrostatic discharge units 21 and one second bidirectional electrostatic discharge unit 22 in the corner region B20, so that there is more wiring space above the first bidirectional electrostatic discharge unit 21.

It should be noted that a main difference between this embodiment and the previous embodiments (the solutions shown in FIG. 3a to FIG. 7) is that a plurality of groups of first bidirectional electrostatic discharge units 21 are provided in the previous embodiments, while one group of first bidirectional electrostatic discharge units 21 is provided in this embodiment. It should be understood that the arrangements of the first electrostatic discharge unit 21, the second electrostatic discharge unit 22, the first signal line L21, the second signal line L22 and the first connecting line R21 and other devices may be similar to or the same as the previous embodiments, and details will not be repeated here. For example, as shown in FIG. 10, the second electrostatic discharge unit 22 may be located on the left side of the second signal line L22. Accordingly, the second electrostatic discharge unit 22 may also be located on the right side of the second signal line L22, and so on.

Embodiments of the present disclosure further provide a display panel including the display substrate as described above.

Embodiments of the present disclosure further provide a display device including the display panel as described above.

In other embodiments of the present disclosure, examples of the display device include a tablet personal computer (PC), a smart phone, a personal digital assistant (PDA), a portable multimedia player, a game console, or a wrist watch-type electronic device, etc. However, embodiments of the present disclosure are not intended to limit the type of the display device. In some exemplary embodiments, the display device may be used not only in a large electronic device such as a television (TV) or an external billboard, but also in a medium or small electronic device such as a PC, a laptop computer, a vehicle navigation device or a camera.

Those skilled in the art may understand that various embodiments of the present disclosure and/or features described in the claims may be combined in various ways, even if such combinations are not explicitly described in the present disclosure. In particular, the various embodiments of the present disclosure and/or the features described in the claims may be combined in various ways without departing from the spirit and teachings of the present disclosure. All these combinations fall within the scope of the present disclosure.

Embodiments of the present disclosure have been described above. However, these embodiments are for illustrative purposes only, and are not intended to limit the scope of the present disclosure. Although various embodiments have been described separately above, this does not mean that measures in the various embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A display substrate, wherein the display substrate comprises at least one corner region, and in at least one of the at least one corner region, the display substrate comprises:
a base substrate;
a plurality of first signal lines and at least one second signal line arranged on the base substrate; and
a plurality of groups of first bidirectional electrostatic discharge units and at least one second bidirectional electrostatic discharge unit arranged on the base substrate, wherein at least one group of first bidirectional electrostatic discharge unit comprises at least one first bidirectional electrostatic discharge unit, and at least one first bidirectional electrostatic discharge unit comprises a first electrostatic discharge end and a second electrostatic discharge end, the first electrostatic discharge end is electrically connected to at least one first signal line, and the second electrostatic discharge end is electrically connected to at least one second signal line through at least one second bidirectional electrostatic discharge unit;
wherein the second electrostatic discharge ends of at least two groups of first bidirectional electrostatic discharge units are electrically connected to the at least one second signal line through a same second bidirectional electrostatic discharge unit.

2. The display substrate according to claim 1, wherein the display substrate further comprises a display region, and the at least one corner region surrounds at least one corner of the display region;
at least one first signal line comprises a part of a fourth signal line in the display region extending to the corner region, and at least one second signal line comprises a part of a fifth signal line at an edge of the display region extending to the corner region;
the at least one second bidirectional electrostatic discharge unit is electrically connected to a plurality of groups of first bidirectional electrostatic discharge units through a first connecting line; and
an orthographic projection of the first connecting line on the base substrate is located on a side of an orthographic projection of the first signal line on the base substrate close to an orthographic projection of the second signal line on the base substrate.

3. The display substrate according to claim 2, wherein the fourth signal line comprises a data line, and the fifth signal line comprises a common voltage signal line.

4. The display substrate according to claim 2, wherein the orthographic projection of the first connecting line on the base substrate is located on a side of the orthographic projection of the second signal line on the base substrate away from the orthographic projection of the first signal line on the base substrate.

5. The display substrate according to claim 4, wherein, in the display region, the display substrate further comprises a plurality of rows of sub-pixels, and in at least one corner region of the display substrate, the display substrate further comprises:
a plurality of third signal lines, wherein at least one third signal line has one end electrically connected to a first connecting portion and the other end electrically connected to at least some sub-pixels in at least one row of sub-pixels, and the first connecting portion is configured to electrically connect the third signal line with a gate driving circuit;
wherein the first connecting line and the third signal line are arranged in a same layer, an orthographic projection of the first connecting portion on the base substrate is located on a side of the orthographic projection of the first signal line on the base substrate close to the orthographic projection of the second signal line on the base substrate, and the orthographic projection of the first connecting line on the base substrate is located on a side of the orthographic projection of the first connecting portion on the base substrate away from the orthographic projection of the first signal line on the base substrate.

6. The display substrate according to claim 5, wherein
the orthographic projection of the first connecting portion on the base substrate is located on a side of the orthographic projection of the second signal line on the base substrate away from the orthographic projection of the first signal line on the base substrate, and
the display substrate further comprises a gate metal layer and a metal conductive layer, the first connecting line and the third signal line are located in the gate metal layer, and the second signal line is located in the metal conductive layer.

7. The display substrate according to claim 5, wherein an orthographic projection of the third signal line on the base substrate is substantially a straight line.

8. The display substrate according to claim 5, wherein an orthographic projection of at least one group of first bidirectional electrostatic discharge units on the base substrate is located between orthographic projections of two adjacent third signal lines on the base substrate.

9. The display substrate according to claim 5, wherein orthographic projections of two adjacent groups of first bidirectional electrostatic discharge units on the base substrate are separated by orthographic projections of a plurality of third signal lines on the base substrate.

10. The display substrate according to claim 2, wherein the orthographic projection of the first connecting line on the base substrate is located between the orthographic projection of the second signal line on the base substrate and the orthographic projection of the first signal line on the base substrate.

11. The display substrate according to claim 10, wherein, in the display region, the display substrate further comprises a plurality of rows of sub-pixels, and in at least one corner region of the display substrate, the display substrate further comprises:
a plurality of third signal lines, wherein at least one third signal line has one end electrically connected to a first connecting portion and the other end electrically connected to at least some sub-pixels in at least one row of sub-pixels, the first connecting portion is configured to electrically connect the third signal line with a gate driving circuit;
wherein the first connecting line and the second signal line are arranged in a same layer, and the orthographic projection of the first connecting line is located between an orthographic projection of the first connecting portion on the base substrate and the orthographic projection of the second signal line on the base substrate.

12. The display substrate according to claim 11, wherein the display substrate further comprises a gate metal layer, and the first connecting line, the second signal line and the third signal line are located in the gate metal layer.

13. The display substrate according to claim 2, wherein an orthographic projection of the second bidirectional electrostatic discharge unit on the base substrate is located between the orthographic projection of the first connecting line on the base substrate and the orthographic projection of the second signal line on the base substrate.

14. The display substrate according to claim 2, wherein
the first bidirectional electrostatic discharge unit comprises a first transistor and a second transistor, and the second bidirectional electrostatic discharge unit comprises a third transistor and a fourth transistor;
a gate electrode of the first transistor, a first electrode of the first transistor and a second electrode of the second transistor are electrically connected to the first signal line, and a second electrode of the first transistor, a first electrode of the second transistor and a gate electrode of the second transistor are electrically connected to a first end of the first connecting line; and
a first electrode of the third transistor, a gate electrode of the third transistor and a second electrode of the fourth transistor are electrically connected to a second end of the first connecting line, and a second electrode of the third transistor, a first electrode of the fourth transistor and a gate electrode of the fourth transistor are electrically connected to the second signal line.

15. The display substrate according to claim 1, wherein an orthographic projection of the second bidirectional electrostatic discharge unit on the base substrate is located on a side of an orthographic projection of an $x^{th}$ group of first bidirectional electrostatic discharge units on the base substrate away from a center of the display substrate; and
wherein the $x^{th}$ group of first bidirectional electrostatic discharge units comprises a group of first bidirectional electrostatic discharge units farthest from the center of the display substrate, and x is a positive integer.

16. The display substrate according to claim 1, wherein one second bidirectional electrostatic discharge unit is provided, and the second electrostatic discharge ends of the plurality of groups of first bidirectional electrostatic discharge units are electrically connected to the at least one second signal line through the second bidirectional electrostatic discharge unit.

17. The display substrate according to claim 1, wherein the display substrate comprises a first side for arranging a source driving circuit and a second side arranged opposite to the first side, and at least one corner region of the display substrate comprises a first corner region on the first side and a second corner region on the second side;

in the first corner region and the second corner region, the display substrate comprises a plurality of groups of first bidirectional electrostatic discharge units and at least one second bidirectional electrostatic discharge unit, and the first signal line electrically connected to the first bidirectional electrostatic discharge unit in the first corner region is different from the first signal line electrically connected to the first bidirectional electrostatic discharge unit in the second corner region; and the first bidirectional electrostatic discharge units correspond to the first signal lines respectively.

18. A display panel, comprising the display substrate of claim 1.

19. A display device, comprising the display panel of claim 18.

20. A display substrate, comprising at least one corner region, wherein, in at least one of the at least one corner region, the display substrate comprises:

a base substrate;

a plurality of first signal lines and at least one second signal line arranged on the base substrate;

a group of first bidirectional electrostatic discharge units and a second bidirectional electrostatic discharge unit arranged on the base substrate; wherein the group of first bidirectional electrostatic discharge units comprises at least one first bidirectional electrostatic discharge unit, and the at least one first bidirectional electrostatic discharge unit comprises a first electrostatic discharge end and a second electrostatic discharge end, the first electrostatic discharge end is electrically connected to at least one first signal line, and the second electrostatic discharge end is electrically connected to at least one second signal line through the second bidirectional electrostatic discharge unit.

21. The display substrate according to claim 20, wherein an orthographic projection of the second bidirectional electrostatic discharge unit on the base substrate is located on a side of an orthographic projection of the first bidirectional electrostatic discharge unit on the base substrate away from a center of the display substrate.

* * * * *